US005790186A

United States Patent [19]

Tenny et al.

[11] Patent Number: 5,790,186

[45] Date of Patent: Aug. 4, 1998

[54] APPARATUS AND METHOD FOR REDUCING SHADE EFFECTS DURING PRINT QUALITY CONTROL

[75] Inventors: Roy Tenny, Ramat Hasharon; Noam Noy, Natania; Michael D. Goldstein, Herzlia; Shay Gilai, Tel Aviv, all of Israel

[73] Assignee: Advanced Vision Technology (A.V.T.) Ltd., Herzlia, Israel

[21] Appl. No.: 579,108

[22] Filed: Dec. 27, 1995

[51] Int. Cl.$^{6}$ .......... H04N 7/18

[52] U.S. Cl. .......... 348/88

[58] Field of Search .......... 348/88, 91, 92, 348/93, 86, 125, 128, 131, 61; 250/208.1; H04N 7/18

[56] References Cited

U.S. PATENT DOCUMENTS

| | | | |
|---|---|---|---|
| 3,829,684 | 8/1974 | Assouline et al. | 250/214 LA |
| 4,247,928 | 1/1981 | Dorfman | 368/67 |
| 4,687,338 | 8/1987 | Task et al. | 356/446 |
| 5,008,783 | 4/1991 | Mastuoka | 362/83.2 |
| 5,016,699 | 5/1991 | Bongardt et al. | 348/128 |
| 5,351,308 | 9/1994 | Kaminer et al. | 382/8 |

OTHER PUBLICATIONS

Print Vision Product Information, AVT—Advanced Vision Technology Ltd © 1993 AVT.

"The Infrared Handbook", George J. Zissis and William L. Wolfe Eds., Library of Congress Catalog card No.: 77-90786, Table of Contents & Index, Chapter 4., 1978.

*Primary Examiner*—Bryan S. Tung

*Attorney, Agent, or Firm*—Mark M. Friedman

[57] ABSTRACT

An apparatus and method for reducing shade effects associated with print quality control, typically generated while viewing or imaging a partly transparent/partly opaque printed material against a light diffusing surface. The reduction in shade effects is by illuminating the printed material from above and viewing or imaging the printed material against a multiple volume light scatterer, thereby redistributing at least part of the light, such that at least part of the scattered light illuminates shaded regions in the image or view obtained.

22 Claims, 2 Drawing Sheets

29
28
30
27b
27a
22
26
21
24
20
32
25

54
52
112
116
114
110
50
56
60
58
62
61
64
64
64
66
68

APPARATUS AND METHOD FOR REDUCING SHADE EFFECTS DURING PRINT QUALITY CONTROL

FIELD AND BACKGROUND OF THE INVENTION

The present invention relates, in general, to an apparatus and a method for reducing shade effects formed during print quality control. More particularly, the present invention relates to an apparatus and a method aimed at reducing shade effects associated with print quality control, which shade effects are typically generated while viewing or imaging a partly transparent/partly opaque printed material (e.g. a web) against a light diffusing surface (e.g., a white or a gray surface), which reduction of thus formed shade effects is achieved according to the present invention by viewing or imaging the printed material against means enabling multiple volume light scattering for scattering light projected onto the printed material, thereby redistributing at least a part of the projected light such that at least part of the scattered light illuminates shaded regions in the printed material, thereby reducing or eliminating the shade effects in the view or image obtained.

Printing processes in general and continuous printing applications such as but not limited to continuous web printing in particular are frequently subjected to on-line print quality control, to enable an on-line monitoring and preferably correction of misregistration and additional aspects associated with quality control should they arise during these printing processes.

Traditionally, print quality control was exercised by sampling followed by inspection of the printed material either by stopping the printing process and viewing the results, or by viewing the end product while the process is still on. However, when continuous printing applications are of concern, sampling and inspection of the printed material has major drawbacks. First, operating, stopping and re-operating a continuous printing process is complicated and time and cost effective, since re-adjustment of the process is required upon re-operation. Second, since the process is continuous, sampling is inherently complicated, time consuming, wasteful and results in destroying the continuity of the product. And finally, in many cases the printed material itself is automatically rolled at the end of the printing process, rendering end-product sampling difficult.

As described hereinabove, sampling and inspection of the printed material is inefficient, therefore means for on-line print quality control were developed. These means include for example manual inspection of a continuous printing web while illuminated by a flashlight synchronously operated in accordance with the web progression, such that a still image is visualized by an inspector. More advanced means for on-line print quality control include image pick-up (i.e., acquisition, capture) devices in which images of the printed material are similarly picked-up by an electronic imaging device such as a video camera (e.g., a CCD) and displayed on a suitable screen. More advanced image pick-up devices such as the PrintVision™—Color Video Inspection for Print Quality Control by Advanced Vision Tecnology (A.V.T.) Ltd., 16 Galgaley haplada St., 46120 Herzlia, Israel, also provide an automated image inspection by, for example, automatically comparing a presently inspected image to a reference image priorly picked-up by the device.

A particular problem associated with on-line print quality control is controlling the quality of printing over a transparent webs (e.g., films) such that the printed material includes transparent zones (i.e., zones which are left un-printed) and opaque zones (i.e., zones which are printed and thus become opaque). Using the above described methods and devices for on-line print quality control while printing over such webs results in transparent zones appearing in black (no light is reflected), and thus quality control is limited to opaque zones only, leaving print defects such as ink-splashes in transparent zones undetected.

One way of solving this problem is to simultaneously employ few light sources for illuminating the web both from the side where the image pick-up device (or viewer) is positioned (e.g., above) and from the opposite side (e.g., underneath), wherein opaque zones reflect light rays of the above light source(s) and transparent zones transmit light rays of the underneath light source(s). However this approach, in which more than one illumination source is involved, generates an inherent problem of controlling the simultaneous operation of the illumination sources. It should be noted that any illumination mistakably applied not in full synchronization with the speed in which the web is advanced, while the continuous printing process is in progress, will completely hamper the image formed by creating what is known in the art as an image overlapping effect. Furthermore, since in many cases the field of view of the image pick-up device is smaller than the width of the web, translation means should be implemented to translate the image pick-up device and the light source across the printed material. Hence using additional light source(s) located in the opposite side as described above creates a need for an additional or a much more complicated and hence cost effective translation means to parallely translate the additional light source(s).

With reference now to FIG. 1, presented is a prior art and widely used approach to overcome the problem of imaging or viewing partly transparent/partly opaque webs, which approach involves placing an opaque light diffusing surface 20 (e.g., a white diffuser) under a web 22 having opaque zones 24 (indicated in bold) and transparent zones 26, which surface 20 reflects light rays 28 generated by light source 29, which light rays 28 illuminate surface 20 after penetrating through transparent zone 26, to generate reflected light rays **27*a*. Light rays 27*b* reflected from opaque zone 24 and reflected light rays 27*a* reflected from surface 20 all reach the eyes of an observer or a camera 30 and an image in which transparent zones 26 appear in white is produced, enabling quality control of opaque 24 as well as transparent 26 zones of web 22. Nevertheless, as further shown in FIG. 1, in the borderline 25 between exemplified opaque zone 24 and transparent zone 26, a shaded region 32 is formed, which shaded region 32** thus appear in black (no light reflection) in the image or view produced.

Few means exist to overcome the shade formation problem thus described, each having its inherent limitations as follows.

First, light rays 28 may be produces by a light source located on camera 30, thus light rays 28 and reflected light rays **27*a* and 27*b* are parallel, hence shaded region 32** is eliminated. However, when reflective materials such as transparent webs (e.g., films) are of concern, this configuration leads to the formation of what is known in the art as light reflection hot spots, which will appear as bright spots in the image or view produced.

Second, instead of using a single light source, few simultaneously operating light sources, each located at a different angle relative to web 22 and surface 20 can be used, each of the light sources illuminates shaded regions associated with all other light sources. However, this requires a simultaneous operation of the few light sources, which simultaneous operation is difficult to achieve due to the flashing nature of the illumination involved. It will be appreciated by one ordinarily skilled in the art that any illumination mistakably applied not in full synchronization with the speed in which the printed material is advanced while the continuous printing process is in progress will completely hamper the image or view formed by creating an image overlapping effect.

Third, shaded region 32 may be significantly reduced or eliminated all together by narrowing or eliminating gap 21 formed between web 22 and surface 20. Narrowing gap 21 may be achieved for example by applying a low pressure within gap 21 to adhere printed material 22 to surface 20. However, adhering printed material 22 to surface 20 creates friction and static effects between web 22 and surface 20, which friction and static effect may harm web 20 and the printing process itself. It should be noted that since printed material 22 is advanced relative surface 20 at a considerably high speed (e.g., typically 900 feet/min for printing packaging materials), attempts to bring printed material 22 to a close proximity, yet no contact, with surface 20 will end up with printed material 22 collapsing onto surface 20 due to the well described venturie effect.

There is thus a widely recognized need for, and it would be highly advantageous to have, an apparatus and a method aimed at reducing shade effects associated with print quality control, which shade effects are typically generated while viewing or imaging a partly transparent/partly opaque printed material against a light diffusing surface, which reduction of thus formed shade effects is achieved by viewing or imaging the printed material against means enabling multiple volume light scattering of light projected onto the printed material, thereby redistributing at least part of the projected light, such that at least part of the scattered light illuminates shaded regions in the printed material, thereby reducing or substantially eliminating the shade effects in the view or image obtained.

SUMMARY OF THE INVENTION

According to the present invention there is provided an apparatus and a method aimed at reducing shade effects associated with print quality control, which shade effects are typically generated while viewing or imaging a partly transparent/partly opaque printed material against a light diffusing surface (e.g., a white or a gray surface), which reduction of thus formed shade effects is achieved by viewing or imaging the printed material against means enabling multiple volume light scattering of light projected onto the printed material, thereby redistributing at least part of the projected light such that at least part of the scattered light illuminates shaded regions in the printed material, thereby reducing the shade effects in the view or image obtained.

According to further features in preferred embodiments of the invention described below, the apparatus comprising (a) a light source for projection of light rays onto the printed material; and (b) means for multiple volume scattering the light being projected onto the printed material, the printed material being between the means and the light source, the means having a far end being located away from the printed material, the means being for redistributing at least a part of the projected light such that at least part of the light illuminates shaded regions in the printed material, thereby reducing the shade effects in a view or image obtained.

According to still further features in the described preferred embodiments the apparatus further comprising (c) an image pick-up device for capturing and displaying the image, the image pick-up device being for collecting light being reflected or scattered from the printed material and the means.

According to further features in preferred embodiments of the invention described below, the method comprising the steps of (a) using a light source for projecting light rays onto the printed material; and (b) scattering the light rays by means having a multiple volume light scattering properties, the printed material being between the means and the light source, the means being for redistributing at least a part of the projected light such that at least part of the light illuminates shaded regions in the printed material, thereby reducing the shade effects in a view or image obtained.

According to still further features in the described preferred embodiments the apparatus further comprising (d) a light diffusing or a light reflecting surface, the light diffusing surface being laid against the far end of the means such that light can not escape trough the far end.

According to still further features in the described preferred embodiments the method further comprising the step of (c) capturing and displaying the image by an image pick-up device, the image pick-up device being for collecting light being reflected or scattered from the printed material and the means.

According to still further features in the described preferred embodiments the image pick-up device is further for inspecting the image.

According to still further features in the described preferred embodiments the image pick-up device includes an electronic imaging device and a screen to display the image.

According to still further features in the described preferred embodiments the electronic imaging device is a video camera.

According to still further features in the described preferred embodiments the means includes a plate, the plate includes a substance having multiple volume light scattering properties.

According to still further features in the described preferred embodiments the means includes multiple light scattering surfaces collectively creating a plate having multiple volume light scattering properties.

According to still further features in the described preferred embodiments the substance is polypropylen, glass containing occlusion bodies, milky plastic, a liquid containing floating bodies or a gas containing floating bodies.

According to still further features in the described preferred embodiments the means includes a device having multiple volume light scattering properties.

According to still further features in the described preferred embodiments the device having the multiple volume light scattering properties is (a) a liquid chamber containing a liquid which contains floating bodies and mixing means for mixing the liquid; (b) a gas chamber containing a gas which contains floating bodies and mixing means for mixing the gas; (c) a chamber containing a mixture of liquid and gas and mixing means for mixing the mixture; (d) a liquid chamber containing a liquid and means for vibrating the liquid; or (e) a liquid crystal having voltage dependent volume light scattering properties.

The present invention successfully addresses the shortcomings of the presently known configurations by providing an apparatus and a method for reducing shade effects associated with print quality control by viewing or imaging the printed material against means enabling multiple volume scattering of light projected onto the printed material, thereby redistributing part of the projected light such that at least part of the scattered light illuminates shaded regions in the printed material, thereby reducing the shade effects in the view or image obtained.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of an apparatus and a method which can be used for reducing shade effects formed during print quality control. Specifically, the present invention can be used to reduce shade effects associated with print quality control, which shade effects are typically generated while viewing or imaging a partly transparent/partly opaque printed material (e.g. a web) against a light diffusing surface (e.g., a white or a gray surface), which reduction of thus formed shade effects is achieved according to the teachings of the present invention by viewing or imaging the printed material against means capable of multiple volume light scattering of light projected onto the printed material, thereby redistributing at least part of the projected light, such that at least part of the scattered light illuminates shaded regions in the printed material, thereby reducing the shade effects in the view or image obtained.

The principles and operation of an apparatus and a method according to the present invention may be better understood with reference to the drawings and accompanying descriptions.

Figure 2:
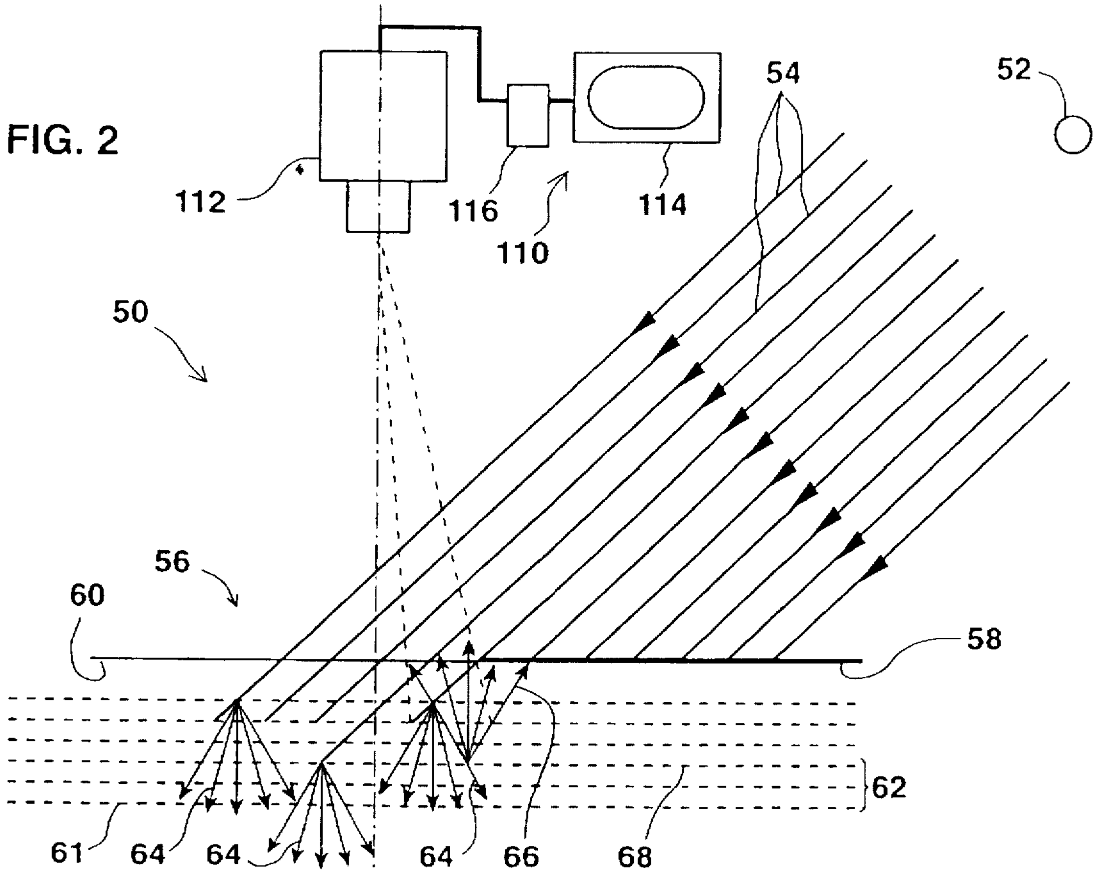
FIG. 2 is a schematic depiction of an apparatus and a method for viewing or imaging a partly opaque/partly transparent web for printing quality control according to the present invention.

Referring now to the drawings, FIG. 2 illustrates the basic features of an apparatus according to the teachings of the present invention, referred to hereinbelow as apparatus 50.

Figure 1:
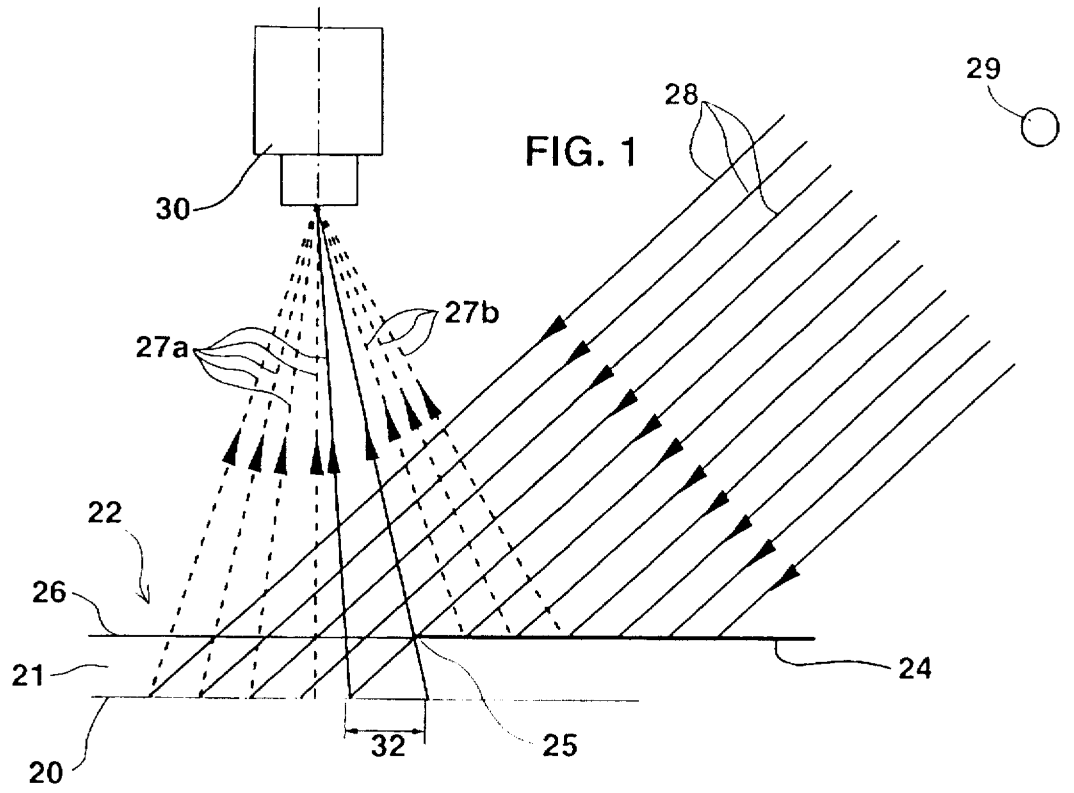
FIG. 1 is a schematic depiction of a prior art method for viewing or imaging a partly opaque/partly transparent web for printing quality control.

Apparatus 50 includes a light source 52 to project light rays 54 onto a printed material such as partly transparent/partly opaque web 56. Light source 52 is preferably a flashlight operating in full synchronization with the speed in which web 56 is advanced during the printing process, such that a still image or a still view is obtained all as previously known in the art and described in the background section above. As further indicated in FIG. 2, web 56 includes opaque zones 58 and transparent zones 60. Apparatus 50 further includes means 62 capable of scattering light rays 54 reaching it after penetrating through transparent zones 60, to generate multiple forward light scatterings and backwards light scatterings as indicated in FIG. 1 by arrow groups 64 and 66, respectively. It should be noted that the light scattering properties of means 62 are not surfacial as of light diffusion properties of light diffusing surface 20 shown in FIG. 1, rather these properties are substantially equally distributed within substantially the whole volume of means 62. Means 62 operates in redistributing at least part of light rays 54 by forward scattering and back scattering as indicated in FIG. 2 by arrow groups 64 and 66, respectively, such that at least part of the light illuminates shaded regions in the printed material, thereby reducing the shade effects in a view or image obtained. As shown in FIG. 1, exemplified by back scattered light indicated by arrows group 66, a shade that would have resulted if means 62 would have been replaced by a light diffusing surface such as surface 20 of FIG. 1, is markedly reduced and, by appropriate means 62 selection may even be substantially eliminated.

As mentioned, the light scattering properties of means 62 are substantially equally distributed within substantially the whole volume of means 62. A detailed mathematical description of light behavior when scattered by means having volume light scattering properties such as means 62 is found in George J. Zissis and William L. Wolfe Eds. The infrared handbook. Chapter 4. "The atmospheric effect". Library of Congress Catalog card No.: 77-90786 which is incorporate by reference as if fully set forth herein.

According to a preferred embodiment, means 62 including a plate which includes a substance 68 having multiple volume light scattering properties as described hereinabove. Suitable substances include, but are not limited to, polypropylen, glass containing occlusion bodies (e.g., tiny and dense air bobbles, known in the art as smoked glass), milky plastic, a liquid containing floating bodies (e.g., gas bobbles, micelles, etc.) and a gas containing floating bodies (e.g., aerosols, hydrosols, smoke, etc.). As in understood by one ordinarily skilled in the art, substance 68 may alternatively include multiple light scattering surfaces collectively creating a plate having multiple volume light scattering properties. As is further understood by one ordinarily skilled in the art, if, for any reason, one plate does not impose enough volume light scattering, a multitude of plates may be combined to form an equivalent of a thicker one.

Figure 3:
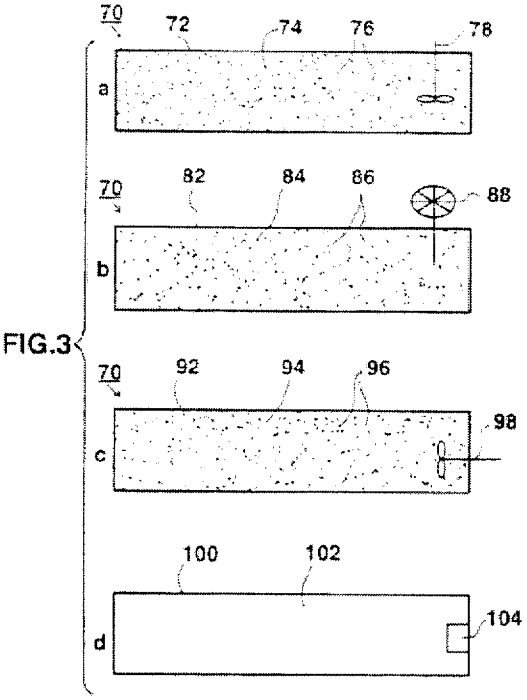
FIGS. 3*a–e* are schematic depictions of five optional means capable of multiple volume light scattering of light rays according to the present invention.
Figure 3E:
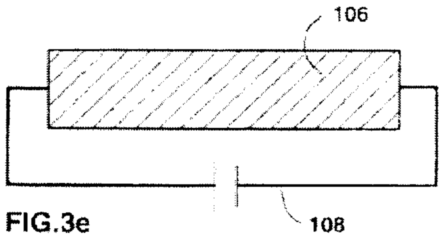

With reference now to FIGS. 3*a–e*, according to another embodiment, means 62 includes a device 70 having multiple volume light scattering properties similar to those of substance 68. Such a device may be but is not limited to either of the following: (a) a liquid chamber 72 containing a liquid 74 which contains floating bodies 76 and mixing means, such as but not limited to propeller 78 as shown in FIG. 3*a;* (b) a gas chamber 82 containing a gas 84 which contains floating bodies 86 and mixing means, such as but not limited to gas ventilation means 78 as shown in FIG. 3*b;* (c) a chamber 92 containing a mixture of liquid 94 and gas 96 and mixing means such as but not limited to propeller 98 as shown in FIG. 3*c;* (d) a liquid chamber 100 containing a liquid 102 and means for vibrating the liquid such as but not limited to piezoelectric crystal 104, as shown in FIG. 3*d;* and (e) a liquid crystal 106 having voltage dependent volume light scattering properties, as indicated by circuit 108 in FIG. 3*e*. It is clear to one ordinarily skilled in the art that the degree of multiple volume light scattering according to these devices is controllable, for example, by controlling the concentration and type of floating bodies, vibrations imposed or voltage applied. Thus controlling the degree of multiple volume light scattering can be useful to obtain optimal results of specific images. Furthermore, a region specific (e.g., pixel) control of the multiple volume light scattering characteristics of some of these devices is also possible if so desired.

In some cases it might be appropriate to further include a light diffusing surface (such as surface 20 in FIG. 1) or a light reflecting surface (e.g., a mirror) laid along far end 61 of means 62 to avoid light leakage as exemplified in FIG. 2 by forward light scattering indicating arrows 64.

Apparatus 50 thus far described is suitable for generating a still, substantially shadeless (or reduced shade) view or image of both opaque and transparent zones of a printed material such as a web. If a view is formed it is manually viewed by a viewer, whereas for image generation apparatus 50 is further equipped with an image pick-up device 110 aimed at capturing and displaying the image, image pick-up device 110 being for collecting light being reflected or scattered from web 56 and means 62. According to a preferred embodiment image pick-up device 110 includes an electronic imaging device such as a video camera 112 (e.g., a CCD, CID, etc.) and a screen 114 to display the image. According to a more preferred embodiment and, as clear to one ordinarily skilled in the art, image pick-up device 110 may further be used for inspection of the image, such a further use is enabled for example by the PrintVision™ device described in the background section above. To this end, image pick-up device 110 further includes suitable computation means such as a personal computer 116 capable of computing suitable algorithms for image inspection and of providing on-line information to a user or automatically deliver appropriate commands to correct the printing process.

According to the present invention there is also provided a method for reducing shade effects associated with print quality control, which shade effects are typically generated while viewing or imaging a partly transparent/partly opaque printed material against a light diffusing surface, the method includes the steps of (a) using a light source for projecting light rays onto the printed material; (b) scattering the light rays by means having a multiple volume light scattering properties, the printed material being between the means and the light source projecting the rays, the means being for redistributing at least a part of the projected light, such that at least part of the light illuminates shaded regions in the printed material, thereby reducing the shade effects in a view or image obtained. According to a preferred embodiment the method further includes the step of (c) capturing and displaying the image by an image pick-up device, the image pick-up device being for collecting light being reflected or scattered from the printed material and the means. According to yet further preferred embodiment the image pick-up device is further used for inspecting the image as described above. Additional features and members associated with the method according to the present invention are as detailed for apparatus 50 above.

The apparatus and method of the present invention differ from prior art approaches described in the background section by providing means capable of volume light scattering and thus by avoiding the use of additional light sources which are difficult to operate synchronously according to the speed in which the printed material advances, thus the invented method and apparatus provide simple and cost effective means (e.g., when a polypropylen plate is employed as described above) to remarkably reduce and in some cases to completely eliminate shaded regions associated with print quality control of partly transparent/partly opaque printed material.

Reference in now made to the following example, which together with the above descriptions, illustrate the invention.

EXAMPLE 1

Figure 4:
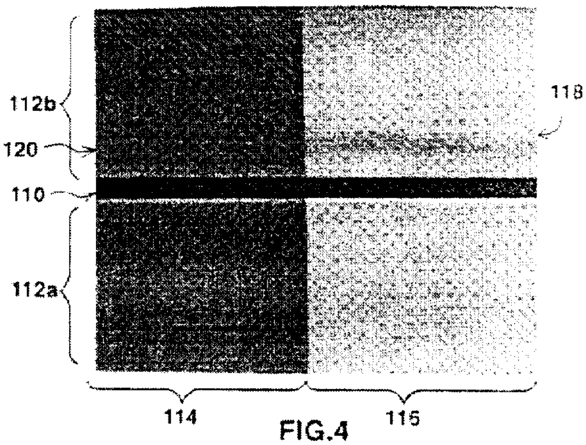
FIG. 4 is a comparative image obtained by the method of the present invention (left) and a prior art method (right) demonstrating the efficiency of the apparatus and method of the present invention in reducing shade effects formed during print quality control.

With reference now to FIG. 4, presented is a comparative image obtained by the method of the present invention, left side, and a prior art method (as exemplified in FIG. 1), right side, demonstrating the efficiency of the apparatus and method of the present invention in reducing shade effects formed during print quality control of partly transparent/partly opaque printed material. For comparison, a web 109 having an opaque zone 110 seen in the image of FIG. 4 as a dark horizontal line crossing through two transparent zones **112*a* and 112*b* (below and above opaque zone 110, respectively) was placed partly above a plate enabling multiple volume light scattering (a two cm thick polypropylen plate in the given example) according to the teachings of the present invention and as indicated by 114 and, partly above a prior art opaque light diffusing surface (a white wallpaper) as indicated by 116. A single flashlight (not shown) located above transparent zone 112*a* was used to synchronously illuminate web 109 to enable image acquisition by a PrintVision™ device (by Advanced Vision Tecnology (A.V.T.) Ltd., not shown) located above opaque zone 110, all as explained above. Note shaded region 118 formed on the prior art light diffusing surface located under transparent zone 112*b* due to the position of opaque zone 110 relative to the flashlight. Further note that the equivalent location, marked 120**, is shadeless when a plate enabling multiple volume light scattering according to the present invention is employed.

While the invention has been described with respect to a limited number of embodiments, it will be appreciated that many variations, modifications and other applications of the invention may be made.

What is claimed is:

1. An apparatus for reducing shade effects associated with print quality control, which shade effects are typically generated while viewing or imaging a partly transparent/partly opaque printed material against a light diffusing surface, the apparatus comprising:

(a) a light source for projecting light rays onto the printed material; and (b) a multiple volume light scatterer for scattering said light rays being projected onto the printed material, said light scatterer and said light source being arranged such that the printed material is interposable therebetween, said light scatterer having a far end being located away from said printed material, said light scatterer being for redistributing at least a part of said projected light, such that at least part of said light illuminates shaded regions in a view or image obtained, thereby reducing the shade effects in the obtained view or image.

2. An apparatus as in claim 1, further comprising:

(c) an image pick-up device for capturing and displaying said image, said image pick-up device being for collecting light being reflected or scattered from said printed material and said light scatterer.

3. An apparatus as in claim 2, wherein said image pick-up device is further for inspecting said image.

4. An apparatus as in claim 2, wherein said image pick-up device includes an electronic imaging device and a screen to display said image.

5. An apparatus as in claim 4, wherein said electronic imaging device is a video camera.

6. An apparatus as in claim 1, further comprising a light diffusing surface, said light diffusing surface being laid against said far end of said light scatterer such that light can not escape trough said far end.

7. An apparatus as in claim 1, further comprising a light reflecting surface, said light reflecting surface being laid against said far end of said light scatterer such that light can not escape trough said far end.

8. An apparatus as in claim 1, wherein said light scatterer includes a plate, said plate includes a substance having multiple volume light scattering properties.

9. An apparatus as in claim 8, wherein said substance is selected from the group consisting of polypropylene, glass containing occlusion bodies, milky plastic, a liquid containing floating bodies and a gas containing floating bodies.

10. An apparatus as in claim 1, wherein said light scatterer includes multiple light scattering surfaces collectively creating a plate having multiple volume light scattering properties.

11. An apparatus as in claim 1, wherein said light scatterer includes a device having multiple volume light scattering properties.

12. An apparatus as in claim 11, wherein said device having said multiple volume light scattering properties is selected from the group consisting of:

(a) a liquid chamber containing a liquid which contains floating bodies and mixing means for mixing said liquid;

(b) a gas chamber containing a gas which contains floating bodies and mixing means for mixing said gas;

(c) a chamber containing a mixture of liquid and gas and mixing means for mixing said mixture;

(d) a liquid chamber containing a liquid and means for vibrating said liquid; and (e) a liquid crystal having voltage dependent volume light scattering properties.

13. A method for reducing shade effects associated with print quality control, which shade effects are typically generated while viewing or imaging a partly transparent/partly opaque printed material against a light diffusing surface, the method comprising the steps of:

(a) using a light source for projecting light rays onto the printed material; and (b) scattering said light rays by a multiple volume light scatterer, by arranging said light scatterer and said light source such that the printed material is interposable therebetween, said light scatterer being for redistributing at least a part of said projected light, such that at least part of said light illuminates shaded regions in a view or image obtained, thereby reducing the shade effects in the obtained view or image.

14. A method as in claim 13, further comprising the step of:

(c) capturing and displaying said image by an image pick-up device, said image pick-up device being for collecting light being reflected or scattered from said printed material and said light scatterer.

15. A method as in claim 14, wherein said image pick-up device is further for inspecting said image.

16. A method as in claim 14, wherein said image pick-up device includes an electronic imaging device and a screen to display said image.

17. A method as in claim 16, wherein said electronic imaging device is a video camera.

18. A method as in claim 13, wherein said light scatterer includes a plate, said plate includes a substance having multiple volume light scattering properties.

19. A method as in claim 18, wherein said substance is selected from the group consisting of polypropylene, glass containing occlusion bodies, milky plastic, a liquid containing floating bodies and a gas containing floating bodies.

20. A method as in claim 13, wherein said light scatterer includes multiple light diffusing surfaces collectively creating a plate having multiple volume light scattering properties.

21. A method as in claim 13, wherein said light scatterer includes a device having multiple volume light scattering properties.

22. A method as in claim 21, wherein said device having said multiple volume light scattering properties is selected from the group consisting of:

(a) a liquid chamber containing a liquid which contains floating bodies and mixing means for mixing said liquid;

(b) a gas chamber containing a gas which contains floating bodies and mixing means for mixing said gas;

(c) a chamber containing a mixture of liquid and gas and mixing means for mixing said mixture;

(d) a liquid chamber containing a liquid and means for vibrating said liquid; and (e) a liquid crystal having voltage dependent light volume scattering properties.

* * * * *